(12) United States Patent
Philhower et al.

(10) Patent No.: US 10,579,384 B2
(45) Date of Patent: Mar. 3, 2020

(54) EFFECTIVE ADDRESS BASED INSTRUCTION FETCH UNIT FOR OUT OF ORDER PROCESSORS

(71) Applicant: International Business Machines Corporation, Armonk, NY (US)

(72) Inventors: Robert A. Philhower, Valley Cottage, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 15/835,563

(22) Filed: Dec. 8, 2017

(65) Prior Publication Data

US 2019/0179641 A1   Jun. 13, 2019

(51) Int. Cl.
  *G06F 9/38* (2018.01)
  *G06F 9/30* (2018.01)
  *G06F 12/0802* (2016.01)

(52) U.S. Cl.
  CPC ........ *G06F 9/3804* (2013.01); *G06F 9/30043* (2013.01); *G06F 9/3863* (2013.01); *G06F 12/0802* (2013.01); *G06F 9/30087* (2013.01); *G06F 2212/682* (2013.01)

(58) Field of Classification Search
  CPC .... G06F 3/0646; G06F 3/0673; G06F 3/0604; G06N 3/0445; G06N 3/0454; G06N 3/063; G06N 3/08; G06N 3/088; G11C 13/0061; G11C 11/54; G11C 17/165; G11C 7/1006; G11C 13/0002; G11C 16/04; G11C 2213/71

USPC .......................................................... 711/125
  See application file for complete search history.

(56) References Cited

U.S. PATENT DOCUMENTS

| | | | |
|---|---|---|---|
| 5,442,766 A | 8/1995 | Chu et al. | |
| 7,017,024 B2 | 3/2006 | Arimilli et al. | |
| 7,941,627 B2 | 5/2011 | Arimilli et al. | |
| 2004/0215921 A1* | 10/2004 | Alexander | G06F 9/3802 711/216 |

OTHER PUBLICATIONS

Anonymously, "Improved prefetching of data in a computer processor by identifying and making use of correlated prefetch queue entry information" Ip.com, Apr. 3, 2013, p. 1-5.

(Continued)

*Primary Examiner* — Mardochee Chery
(74) *Attorney, Agent, or Firm* — Cantor Colburn LLP; Jason Sosa

(57) ABSTRACT

Aspects of the invention include a computer-implemented method for executing one or more instructions by a processing unit. The method includes receiving, by an instruction fetch unit (IFU), a request to fetch an instruction for execution, wherein the instruction includes an effective address (EA). The IFU can further access an instruction cache directory (I-directory) using the EA of the requested instruction to determine whether the EA of the requested instruction matches an EA stored in an associated instruction cache (I-cache). An instruction cache (I-cache) can output the requested instruction in response to or based at least in part on determining that the requested instruction EA matches an entry in the I-cache. A decode unit can decode the requested instruction output by the I-cache.

20 Claims, 9 Drawing Sheets

(56) References Cited

OTHER PUBLICATIONS

Anonymously, "Method and Apparatus for Early Fetch Redirection in a computer processor" Ip.com, Nov. 20, 2012, p. 1-6.
Pritpal S. Ahuja, et al.,"Performance Potential of Effective Ad+dress Prediction of Load Instructions", VSSAD, Alpha Development Group, Compaq Computer Corporation; 2004, p. 1-12.

* cited by examiner

EFFECTIVE ADDRESS BASED INSTRUCTION FETCH UNIT FOR OUT OF ORDER PROCESSORS

BACKGROUND

Embodiments of the present invention relate in general to an out-of-order (OoO) processor and more specifically to effective address based instruction fetch unit in out of order processors by removal of effective-to-real address table entries in an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

In the OoO processor, a level one cache (L1) instruction cache is often incorporated on the processor chip. The L1 is intended to hold instructions considered likely to be executed in the immediate future. The L1 instruction cache complex includes an effective-to-real address table (ERAT), which functions as a cache of the address translation table for main memory. The ERAT contains pairs of effective and corresponding real address portions. ERAT entries are accessed with a hash function of the effective address of a desired instruction. The effective address portion in the ERAT entry is then compared with the effective address of the desired instruction to verify an ERAT hit. The corresponding real address portion is compared with a portion of real address in a directory array to verify a cache hit.

SUMMARY

Embodiments of the present invention include methods, systems, and computer program products for an effective address (EA) based instruction fetch unit (IFU). A non-limiting example of the computer-implemented method includes receiving, by an IFU, a request to fetch an instruction for execution (an instruction can be one or more instructions), wherein the request includes an effective address (EA). The IFU can further access an instruction cache directory (I-directory) using the EA of the requested instruction to determine whether the EA of the requested instruction matches an EA stored in an associated instruction cache (I-cache). An instruction cache (I-cache) outputs the requested instruction in response to or based at least in part on determining that the requested instruction EA matches an entry in the I-cache. A decode unit can decode the requested instruction output by the I-cache.

Embodiments of the present invention are directed to a system. A non-limiting example of the system includes one or more processors in communication with one or more types of memory. The system can include an instruction fetch unit (IFU), the IFU comprising an instruction directory array (I-directory), wherein the I-directory contains one or more effective addresses (EA). The system can also include an instruction cache (I-cache) and a decode unit operable to decode an instruction (an instruction can be one or more instructions) to be executed. The IFU can be operable to receive a request to execute an instruction, wherein the request includes an EA, access the I-directory using the requested instruction EA to determine whether the requested instruction EA matches an EA stored in the I-cache and output, to the decode unit, the requested instruction in response to or based at least in part on determining that the requested instruction EA matches an entry in the I-cache.

Embodiments of the present invention are directed to a computer program product. A non-limiting example of the computer program product includes a storage medium readable by a processor that can store instructions for execution by the processor to perform operations of a method. The method can include receiving a request to fetch an instruction (an instruction can be one or more instructions) for execution, wherein the request includes an effective address (EA). The method can further include accessing an instruction cache directory (I-directory) using the requested instruction EA to determine whether the requested instruction EA matches an EA stored in an associated instruction cache (I-cache). The method can further include outputting the requested instruction in response to or based at least in part on determining that the requested instruction EA matches an entry in the I-cache and decoding the requested instruction output by the I-cache.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
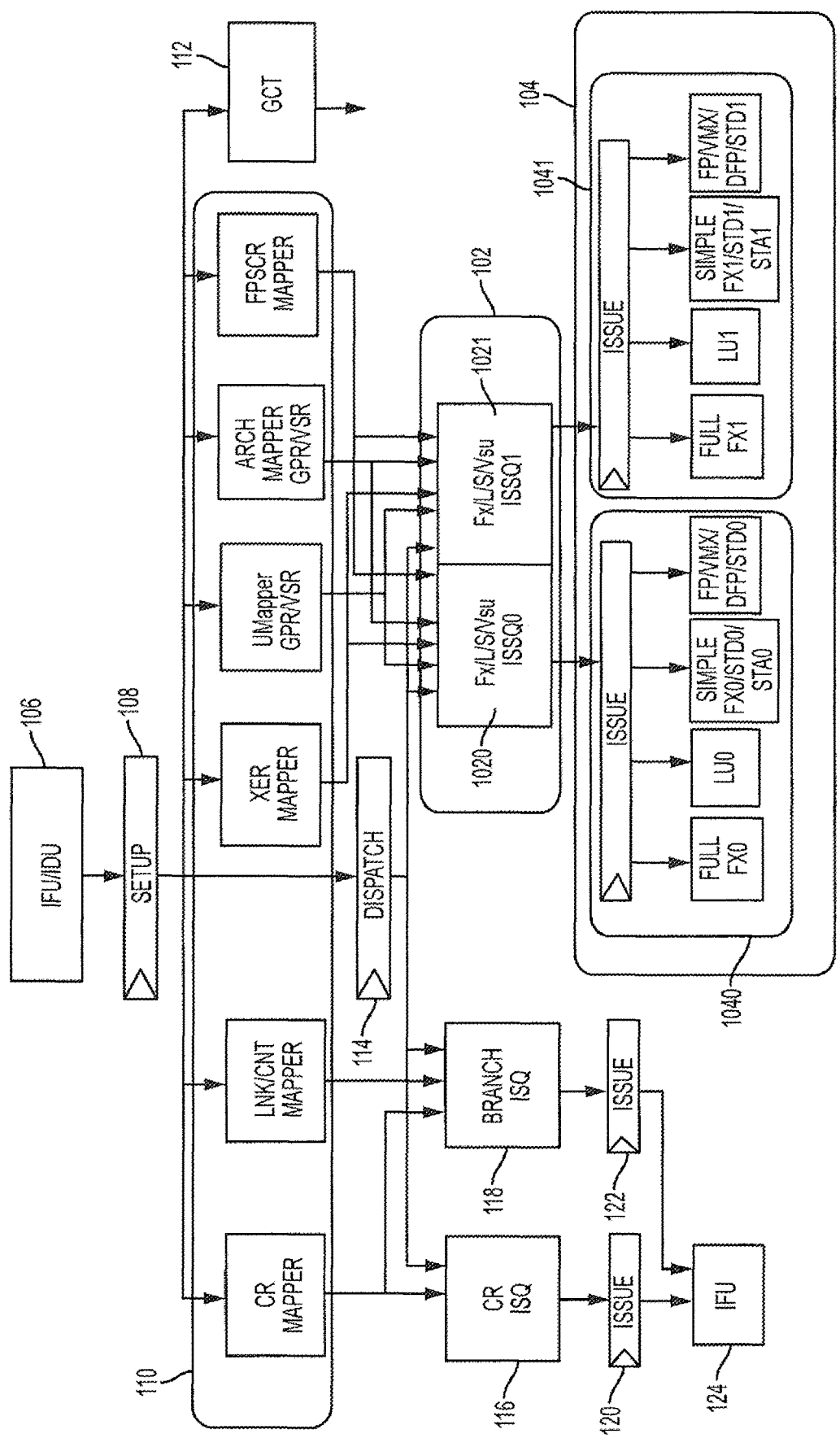
FIG. 1 depicts a block diagram of a system that includes an effective address based instruction fetch unit (IFU) in an OoO processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention described herein provide an effective address (EA) based instruction fetch unit/instruction decode unit (IFU/IDU) allowing for the removal of an effective to real address table (ERAT) in the OoO processor. The technical solutions described herein are related to an IFU having an I-directory that uses an effective address (EA) instead of a real address (RA), and in which the IFU uses an effective real table (ERT) instead of an ERAT, to facilitate reduction in chip area and further to improve timing of OoO processors. While the ERAT stores EA-RA translations and accessed for all instruction fetches, the ERT stores both EA-to-RA and RA-to-EA translations and accessed for only those instruction fetches that miss the I-Cache directory. An I-Cache miss happens fairly infrequently so the power and area consumption is less with the present invention.

Most modern computing devices provide support for virtual memory. Virtual memory is a technique by which application programs are given the impression that they have a contiguous working memory, or address space, when in fact the physical memory may be fragmented and may even overflow onto disk storage. Essentially, the application program is given a view of the memory of the computing device where the application accesses a seemingly contiguous memory using an EA, in the EA space visible to the application, which is then translated into a physical address of the actual physical memory or storage device(s) to actually perform the access operation. An EA is the value which is used to specify a memory location that is to be accessed by the operation from the perspective of the entity, e.g., application, process, thread, interrupt handler, kernel component, etc., issuing the operation.

That is, if a computing device does not support the concept of virtual memory, then the EA and the physical address are one and the same. However, if the computing device does support virtual memory, then the EA of the particular operation submitted by the application is translated by the computing device's memory mapping unit into a physical address, which specifies the location in the physical memory, or storage device(s) where the operation is to be performed.

Further, in modern computing devices, processors of the computing devices use processor instruction pipelines, comprising a series of data processing elements, to process instructions (operations) submitted by entities, e.g., applications, processes, etc. Instruction pipelining is a technique to increase instruction throughput by splitting the processing of computer instructions into a series of steps with storage at the end of each step. Instruction pipelining facilitates the computing device's control circuitry to issue instructions to the processor instruction pipeline at the processing rate of the slowest step, which is much faster than the time needed to perform all steps at once. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

Such pipelined processors may take the form of in-order or OoO pipelined processors. For in-order pipelined processors, instructions are executed in order such that if data is not available for the instruction to be processed at a particular stage of the pipeline, execution of instructions through the pipeline may be stalled until the data is available. OoO pipelined processors, on the other hand, allow the processor to avoid stalls that occur when the data needed to perform an operation are unavailable. The OoO processor instruction pipeline avoids these stalls by filling in "slots" in time with other instructions that are ready to be processed and then re-ordering the results at the end of the pipeline to make it appear that the instructions were processed in-order. The way the instructions are ordered in the original computer code is known as program order, whereas in the processor they are handled in data order, i.e. the order in which the data and operands become available in the processor's registers.

Modern processor instruction pipelines track an instruction's EA as the instruction flows through the instruction pipeline. It is important to track the instruction's EA because this EA is utilized whenever the processing of an instruction results in the taking of an exception, or a recovery from branch misprediction is needed, or a recovery from an out-of-order hazard condition is needed. In these situations, the instruction pipeline is flushed to a prior state, and the instruction fetch starts from a new memory location. On an exception, the new memory address can be an interrupt vector location (and the EA of the instruction causing the exception is stored for later use). On a branch misprediction, the new memory address can be the target or fall-through path of the branch, depending on the type of misprediction. On a recovery from an out-of-order hazard condition, the new memory location can be based on the EA of the appropriate load or store operation.

Tracking an instruction's EA can be costly in terms of processor chip area, power consumption, and the like. This is because EAs can have large sizes (e.g., 64 bits) and modern processor instruction pipelines are deep, i.e. have many stages, causing the lifetime of an instruction from an instruction fetch stage of the processor instruction pipeline to a completion stage of the processor instruction pipeline to be very long. This cost may be further increased in highly multithreaded OoO processors, i.e. processors that execute instructions from multiple threads in an out-of-order manner, since a vast number of instructions from different address ranges can be processing, i.e. are "in flight," at the same time.

Turning now to FIG. 1, a block diagram of a system 100 that includes an instruction sequencing unit (ISU) of an out-of-order (OoO) processor for implementing the technical solutions for an effective address based instruction fetch unit is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed-point instructions (FX), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in single threaded (ST) mode, the issue queue 102 can be used as a single logical issue queue that contains both ISQ0 1020 and ISQ1 1021 to process all of the instructions (in this example all N instructions) of a single thread.

When the processor is executing in simultaneous multi-threaded (SMT) mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units, 1040 and 1041. Both groups of execution units, 1040 and 1041, that are shown in FIG. 1, include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1).

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in SMT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

In one or more examples, the system 100, in accordance with the illustrative embodiments, is an OoO processor.

Figure 2:
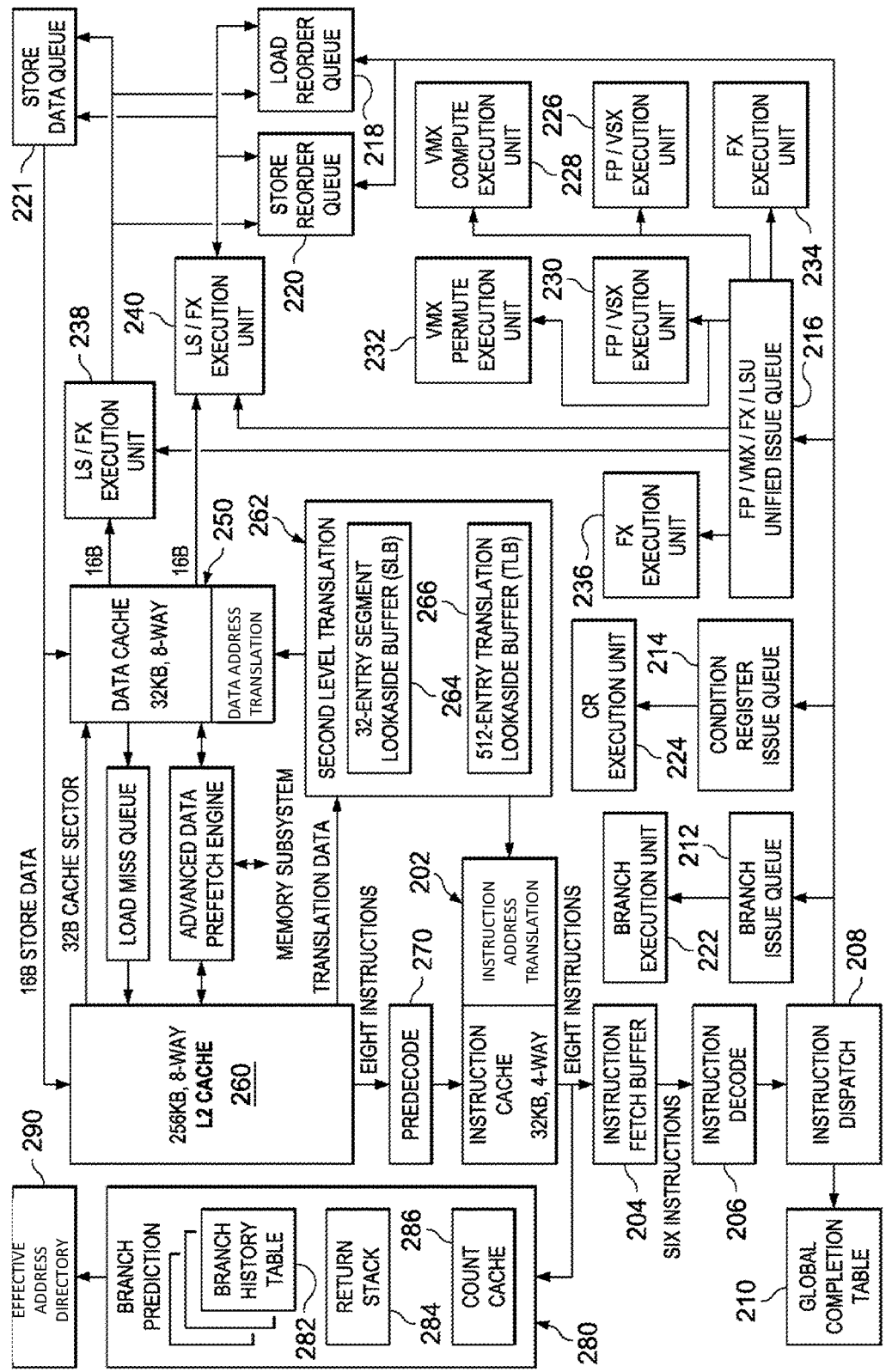
FIG. 2 is an exemplary block diagram of an OoO processor in which an effective address directory (EAD) and the associated mechanisms for utilizing this EAD are implemented according to one or more embodiments of the present invention.

Turning now to FIG. 2, an exemplary block diagram of an OoO processor in which an effective address directory (EAD) and the associated mechanisms of system 100 for utilizing the EAD are implemented is generally shown according to one or more embodiments of the present invention. As shown in FIG. 2, the processor architecture includes an instruction cache (I-cache) 202, an instruction fetch buffer 204, an instruction decode unit 206, and an instruction dispatch unit 208. Instructions are fetched by the instruction fetch buffer 204 from the I-cache 202 and provided to the instruction decode unit 206. The instruction decode unit 206 decodes the instruction and provides the decoded instruction to the instruction dispatch unit 208. The output of the instruction dispatch unit 208 is provided to the global completion table 210 and one or more of the branch issue queue 212, the condition register issue queue 214, the unified issue queue 216, the load reorder queue 218, and/or the store reorder queue 220, depending upon the instruction type. The instruction type is determined through the decoding and mapping of the instruction decode unit 206. The issue queues 212-220 provide inputs to various ones of execution units 222-240. The data cache 250, and the register files contained with each respective unit, provides the data for use with the instructions.

When presented with an EA of a requested instruction, the L1 I-cache 202 can determine whether the requested instruction resides in the L1 I-cache 202 and return the instruction if the instruction resides in the L1 I-cache 202. If the instruction does not reside in the L1 I-cache 202, the L1 I-cache 202 can initiate an action to obtain the instruction from elsewhere (e.g., L2 cache, main memory).

The instruction cache 202 receives instructions from the L2 cache 260 via the second level translation unit 262 and pre-decode unit 270. The second level translation unit 262 uses its associate segment look-aside buffer 264 and translation look-aside buffer 266 to translate addresses of the fetched instruction from EAs to system memory addresses. The pre-decode unit partially decodes instructions arriving from the L2 cache and augments them with unique identifying information that simplifies the work of the downstream instruction decoders.

The instructions fetched into the instruction fetch buffer 204 are also provided to the branch prediction unit 280 if the instruction is a branch instruction. The branch prediction unit 280 includes a branch history table 282, return stack 284, and count cache 286. These elements predict the next EA that should be fetched from the instruction cache. A branch instruction is a point in a computer program where flow of control is altered. It is the low-level machine instruction that is generated from control constructs in a computer program, such as if-then-else or do-while statements. A branch can be not taken, in which the flow of control is unchanged and the next instruction to be executed is the instruction immediately following it in memory, or it can be taken, in which the next instruction to be executed is an instruction at some other place in memory. If the branch is predicted to be taken, a new EA is presented to the instruction cache 202; otherwise, the EA of the instruction immediately following the branch is presented to the instruction cache 202.

The EA and associated prediction information from the branch prediction unit are written into an effective address directory (EAD) 290. This EA is later confirmed by the branch execution unit 222. If correct, the EA remains in the directory until all instructions from this address region have completed their execution. If incorrect, the branch execution unit flushes out the address and the corrected address is presented to the instruction cache 202. The EAD 290 also includes a logic unit that facilitates using the directory as a CAM.

Instructions that read from or write to memory (such as load or store instructions) are issued to the LS/EX execution unit 238, 240. The LS/EX execution unit retrieves data from the data cache 250 using a memory address specified by the instruction. This address is an effective address and needs to first be translated to a system memory address via the second level translation unit before being used. If data specified by the address is not found in the data cache, the load miss queue is used to manage the miss request to the L2 cache. In order to reduce the penalty for such cache misses, the advanced data prefetch engine predicts the addresses that are likely to be used by instructions in the near future. In this manner, data will likely already be in the data cache when an instruction needs it, thereby preventing a long latency miss request to the L2 cache.

The LS/EX execution unit 238, 240 executes instructions out of program order by tracking instruction ages and memory dependences in the load reorder queue 218 and store reorder queue 220. These queues are used to detect when OoO execution generated a result that is not consistent with an in-order execution of the same program. In such cases, the current program flow is flushed and performed again.

The processor architecture further includes the effective address directory (EAD) 290 that maintains the effective address of a group of instructions in a centralized manner such that the EA is available when needed but is not required to be passed through the pipeline. Moreover, the EAD 290 includes circuitry and/or logic for supporting OoO processing. FIG. 2 shows the EAD 290 being accessed via the branch prediction unit 280, however, it should be appreciated that circuitry may be provided for allowing various ones of the units shown in FIG. 2 to access the EAD 290 without having to go through the branch prediction unit 280.

Figure 3:
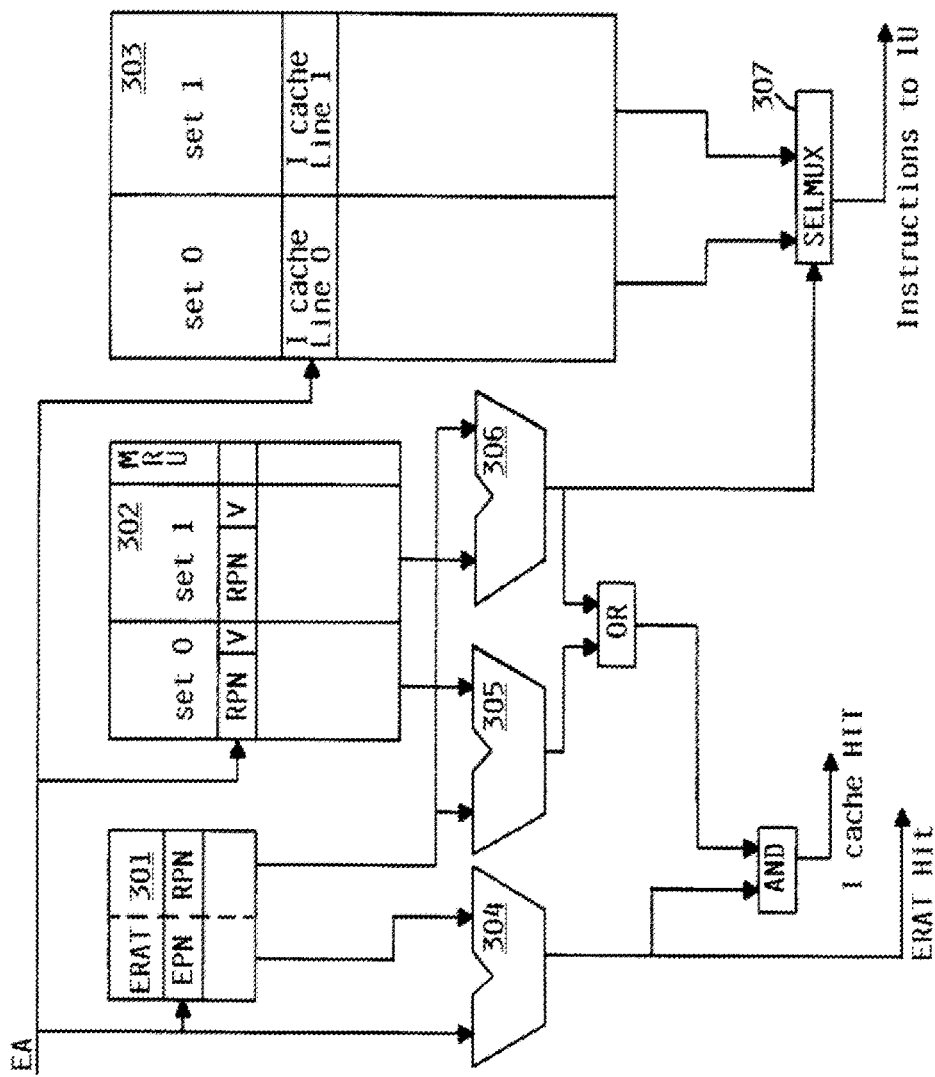
FIG. 3 is an exemplary block diagram illustrating a portion of an IFU in accordance with one illustrative embodiment.

FIG. 3 illustrates a contemporary L1 instruction cache, for example, L1 I-cache 202, according to an illustrative embodiment of the present invention. The L1 I-cache 202 includes an effective-to-real address table (ERAT) 301, I-cache directory array (I-directory) 302, and I-cache instruction array (I-cache) 303. I-cache 303 stores the instructions, which are supplied to the instruction fetch buffer 204 for execution. I-directory 302 contains a collection of real page numbers (RPNs), validity bits, and other information, used to manage I-cache 303, and in particular to determine whether a desired instruction is in fact in the I-cache 303. ERAT 301 contains pairs of effective page numbers (EPNs) and RPNs, and is used for associating effective addresses with real addresses.

When determining whether a requested instruction resides in the L1 I-cache 202, the following actions can occur concurrently: (a) the EA is used to access an entry in ERAT 301 to derive an EPN and associated RPN; (b) the EA from IFU/IDU 106 is used to access an entry in the I-directory 302 to derive a pair of RPNs; (c) the EA is also used to access an entry in I-cache 303 to derive a pair of cache lines containing instructions.

In each case above, the input to any one of ERAT 301, I-directory 302, or I-cache 303, is not dependent on the output of any other one of these components, so that none of the above actions need await completion of any other before beginning. The output of the ERAT 301, I-directory 302, and I-cache 303 are then processed as follows: (a) the EPN from ERAT 301 is compared with the same address bits of the presented EA in comparator 304; if they match, there has been an ERAT "hit." (But where addressing in E=R mode, the ERAT 301 could be always deemed "hit" regardless of the comparison.); (b) the RPN from ERAT 301 is compared with each of the RPNs from I-directory 302 in comparators 305 and 306; if either of these match, and if there has been an ERAT hit, then there is an I-cache "hit", i.e., the requested instruction is in fact in L1 I-cache 202, and specifically, in I-cache 303; (c) the output of the comparison of RPNs from ERAT 301 and I-directory 302 is used to select (using selection multiplexer 307) which of the pair of cache lines from I-cache 303 contains the desired instruction.

Performing these actions concurrently minimizes delay in the most common case where the desired instruction is actually in the L1 I-cache 202. Whether or not the desired instruction is in the L1 I-cache 202, some data will be presented on the L1 I-cache output to the instruction fetch buffer 204. A separate L1 I-cache hit signal will indicate to IFU/IDU 106 that the output data is in fact the desired instruction. Where the L1 I-cache hit signal is absent, the instruction fetch buffer 204 will ignore the output data.

Where there has been an I-cache miss, there are two possibilities: (a) there has been an ERAT hit, but the instruction is not in the I-cache 303; or (b) there has been an ERAT miss. In the case where there has been an ERAT hit, the ERAT 301 contains the RPN for the desired data known to be in main memory (and possibly in an L2 cache). L1 I-cache 202 can construct a full real address (RA) of the desired instruction from ERAT data, without accessing external address translation mechanisms and fetch the desired data directly from L2 cache or memory. In the case where there has been an ERAT miss, an external address translation mechanism must be accessed in order to construct the RA of the desired instruction and subsequently update the ERAT 301 as necessary with the new RPN.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. In addition, the processes of the illustrative embodiments may be applied to a multiprocessor data processing system, other than the SMP system mentioned previously, without departing from the spirit and scope of the present invention.

Moreover, the described data processing system may take the form of any of a number of different data processing systems including client computing devices, server computing devices, a tablet computer, laptop computer, telephone or other communication device, a personal digital assistant (PDA), or the like. In some illustrative examples, data processing system may be a portable computing device configured with flash memory to provide non-volatile memory for storing operating system files and/or user-generated data, for example. Essentially, data processing system 100 may be any known or later developed data processing system without architectural limitation.

As will be appreciated by one skilled in the art, the present invention may be embodied as a system, apparatus, or method. In one illustrative embodiment, the mechanisms are provided entirely in hardware, e.g., circuitry, hardware modules or units, etc. of a processor. However, in other illustrative embodiments, a combination of software and hardware may be utilized to provide or implement the features and mechanisms of the illustrative embodiments. The software may be provided, for example, in firmware, resident software, micro-code, or the like. The various flowcharts set forth hereafter provide an outline of operations that may be performed by this hardware and/or combination of hardware and software.

In illustrative embodiments in which the mechanisms of the illustrative embodiments are at least partially implemented in software, any combination of one or more computer usable or computer readable medium(s) that store this software may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), etc.

Typically, for every load and every store instruction, an EA is converted to the corresponding RA. Such an EA to RA conversion is also performed for an instruction fetch (I-fetch). Such conversion typically requires an effective to real address table (ERAT) for retrieval of instructions from lower order memory. In the technical solutions described herein, the EA to RA conversion is not performed for every load and store instruction, rather only in case of load-misses, I-Fetch misses, and all stores.

Further yet, the technical solutions herein also facilitate a new ERT structure that keeps translations for all valid lines in the instruction cache (I-Cache) and the data cache (D-Cache) in both directions: EA-to-RA and RA-to-EA. In addition, the ERT is updated in response for invalidation handling in the translation lookaside buffer (TLB) or the segment lookaside buffer (SLB). When an entry is invalidated from the ERT, any line in the I-Cache or D-Cache with a matching EA will be invalidated. This keeps the EA-based I-Cache in sync with the translation.

By using only EA for the operations, the technical solutions facilitate the removal of an ERAT from an IFU and allowing the IFU to utilize an ERT data structure to manage translations. As such, one of the primary differences utilizing the new ERT versus the ERAT is that an I-directory contains the EA instead of the RA.

Removing the ERAT reduces chip area of the processor used, thus facilitating a reduction in chip area over typical processors. In addition, the processor consumes less power compared to typical processors by not performing the above translation operations when the requested instruction is present in the L1 I-Cache.

Figure 4:
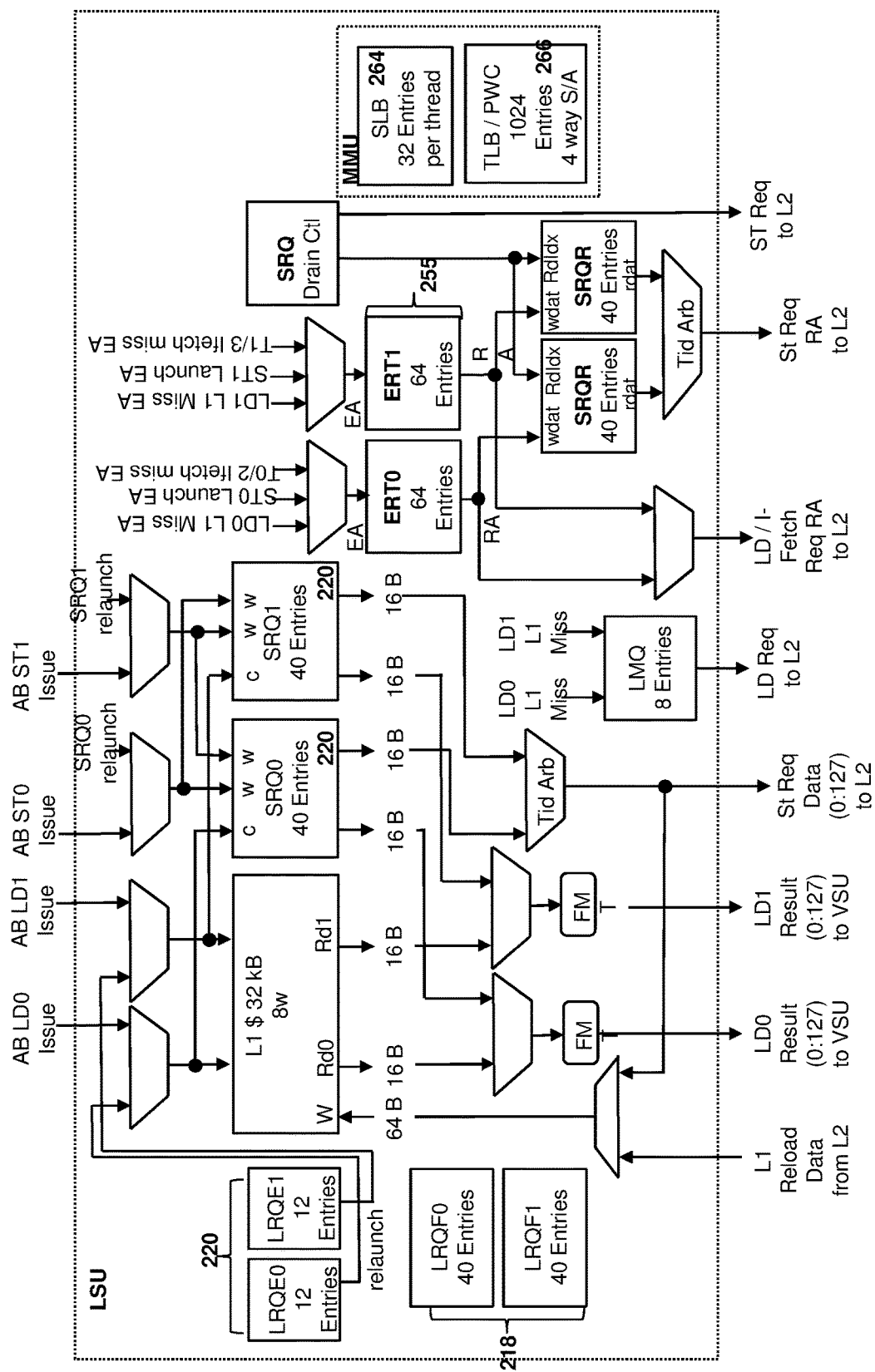
FIG. 4 depicts a load-store unit (LSU) of a processing core according to one or more embodiments of the present invention.

Referring again to the figures, FIG. 4 depicts a load-store unit (LSU), for example, LSU of a processing core according to one or more embodiments of the present invention can contain a LU0, LU1, STD0, STD1, STA0 and STA1, as described in FIG. 1. The LSU depicted facilitates execution in a two-load, two-store mode; however, it should be noted that the technical solutions described herein are not limited to such an LSU. The execution flow for the LSU is described below. From the load or store instructions, the EA (effective address, as used by the programmer in a computer program) is generated. Similarly, for instruction fetch also an EA is generated. Typically, in contemporary systems the EA is converted to RA (real address, as used by the hardware, after EA-to-RA translation) for every load and store instruction, which requires larger chip area and more chip power due to frequent translations, among other technical challenges.

The LSU includes a load-reorder-queue (LRQF) 218, where all load operations are tracked from dispatch to complete, similar to an LRQ 218 in typical LSU designs. The LSU further includes a second load-reorder-queue LRQE 225. When a load is rejected (for cache miss, or translation miss, or previous instruction it depends on being rejected) the load is taken out of the issue queue and placed in a LRQE entry for it to be re-issued from there. The depicted LRQE 225 is partitioned into 2 instances, LRQE0, and LRQE1 for the two load mode, with 12 entries each (24 entries total). In ST mode, no threads/pipe based partition exists. In the SMT mode, T0, T2 operations launched on pipe LD0; and T1, T3 operations launched on pipe LD1, for relaunch.

As depicted, the LRQF 218 is partitioned into 2 instances LRQF0 and LRQF1 for the two load mode, with 40 entries (each instance). The LRQF 218 is circular in order entry allocation, circular in order entry drain, and circular in order entry deallocation. Further, in SMT mode, T0, T2 operations launched on pipes LD0, ST0; and T1, T3 operations launched on pipes LD1, ST1. In ST mode, the LRQF does not have any pipes/threads.

In case of a cross invalidation flush (XI flush), for the LRQF, NTC+1 flush any thread that an XI or store drain from another thread hits so that explicit L/L ordering flushes on sync's is not performed by the LSU 1042 in case of the XI flush.

All stores check against the LRQF 218 for SHL detection, upon which the LRQF 218 initiates a flush of any load, or everything (any instruction/operation) after the store. Further, DCB instructions check against the LRQF 218 for SHL cases, upon which the LRQF 218 causes a flush of the load, or everything after the DCB. Further, all loads check against the LRQF 218 for LHL detection (sequential load consistency), upon which the LRQF 218 causes a flush of younger load, or everything after the older load. In one or more examples, the LRQF 218 provides quad-word atomicity, and the LQ checks against the LRQF 218 for quad atomicity and flushes LQ if not atomic. Further yet, in case of LARX instructions, the LSU 1042 checks against the LRQF 218 for larx-hit-larx cases, and in response flushes younger LARX, or everything after the older larx instruction.

Thus, the LRQF 218 facilitates tracking all load operations from issue to completion. Entries in the LRQF 218 are indexed with Real_Ltag (rltag), which is the physical location in the queue structure. The age of a load operation/entry in the LRQF 218 is determined with a Virtual_Ltag (vltag), which is in-order. The LRQF flushes a load using GMASK and partial group flush using GTAG and IMASK. The LRQF logic can flush from current iTag or iTag+1 or precise load iTag.

Further yet in accordance with one or more embodiments of the present invention, the LRQF does not include an RA (8:51) field typically used by contemporary implementations, and instead is EA-based and includes an ERT ID (0:6), and EA(40:51) (saving of 24 bits). The LRQF page match on SHL, LHL is based on ERT ID match. Further, Each LRQ entry has a "Force Page Match" bit. When an ERT ID is invalidated that matches the LRQ Entry ERT ID the Force Page Match bit is set. The LRQ will detect LHL, SHL, and store ordering flushes involving any entry with Force Match Match=1.

The SRQ 220 of the LSU 1042 has similar structure as the LRQF 218, with two instances SRQR0 and SRQR1 of 40 entries (each instance), which are circular in order entry allocation, circular in order entry drain, and circular in order entry deallocation. Further, the SRQ 220 is partitioned similar to the LRQ 218, for example T0, T2 ops launched on pipes LD0, ST0; T1, T3 ops launched on pipes LD1, ST1; and no pipe/thread partition in ST mode. In the ST mode, both copies have identical values, with the copies being different in the SMT modes. In SMT4 mode, both instances are further partitioned, with each thread allocated 20 entries from the SRQ 220 (see example partition for LRQF described herein). In one or more examples, for store drain arbitration, an intra-SRQ read pointer multiplexing is performed in the SMT4 mode. Alternatively, or in addition, an inter SRQ0/1 multiplexing is performed in SMT2, and SMT4 modes. In the ST mode drain is performed only on SRQ0.

Each entry of the SRQ 220 contains a store TID(0:1), an ERT ID(0:6), EA(44:63), and RA(8:51). To detect LHS, the LSU 1042 uses the {Store Tid, EA(44:63)}, thus eliminating RA LHS alias check. The ERT ID is used to "catch" EA(44:63) partial match mis-speculation. The SRQ entry has the RA(8:51), which is translated at store agen, and is only used when sending store requests to the L2 (store instruction drained, not issued). Each SRQ entry also has a "Force Page Match" bit. The force page match bit is set when an ERT ID is invalidated that matches the SRQ entry ERT ID. The SRQ can detect LHS involving any entry with Force Page Match=1. For example, LHS against an entry with Force Page Match=1 causes a reject of the load instruction. Further, a store drain forces a miss in the L1 cache if Force Page Match=1 for the SRQ entry. This works in tandem with "Extended store hit reload" Load Miss Queue (LMQ) actions.

For example, for an LMQ, an LMQ Address Match={ERT ID, EA Page Offset(xx:51), EA(52:56)} match. Further, a "Force Page Match" bit of each LMQ entry is set (=1) when an ERT ID is invalidated that matches the LMQ Entry ERT ID. The LMQ rejects a load miss if a valid LMQ entry[x]ForcePageMatch=1 and Ld Miss EA[52:56]=LMQEntry[X]EA(52:56). Further, the LMQ has an extended store hit reload. For example, LMQ suppresses reload enable if Reload EA(52:56)=SRQEntry[X] EA(52:56) and SRQEntry[X]ForcePageMatch=1. Alternatively, or in addition, LMQ suppresses reload enable if LMQEntry[X] EA(52:56)=StDrain EA(52:56) and StDrainForcePageMatch=1.

The LSU depicted collapses a Store Data Queue (SDQ) as part of the SRQ 220 itself to further save chip area. The operands are stored in an entry of the SRQ itself if the operand size is less than the SRQ entry size, for example 8 bytes. In case of wider operands, such as vector operands, for example are 16 bytes wide, the SRQ stores the operands using two consecutive entries in the SRQ 220 in MT mode. In ST mode, the wider operands are stored in the SRQ0 and SRQ1, for example 8 bytes each.

The SRQ 220 queues operations of type stores, barriers, DCB, ICBI or TLB type of operations. A single s-tag is used for both store_agen and store_data. The SRQ 220 handles load-hit-store (LHS) cases (same thread only). For example, all loads issued are checked by the SRQ 220 to ensure there are no older stores with a data conflict. For example, the data conflict is detected by comparing loads EA and data byte flags against older stores in the SRQ EA array.

SRQ entries are allocated at dispatch where the dispatched instruction tags (itags) are filled into the correct row. Further, SRQ entries are deallocated on store drain. In one or more examples, the itag arrays hold "overflow" dispatches. For example, information is written into the itag array at dispatch if the row in the SRQ that is desired, say SRQ entry x is still in use. When, the SRQ entry x is deallocated, its corresponding row in the SRQ overflow itag structure is read out and copied into the main SRQ itag array structure (read of the overflow itag structure gated by whether there are any valid entries in the overflow itag array for a given thread/region). The main SRQ 0/1 itag array is cammed (or ½ cammed in SMT4) to determine which physical row to write into upon store issue, so that the ISU issues stores based on the itag. The SRQ 220 sends to the ISU, the itag when a store drains & deallocates.

The ISU assigns virtual sub-regions to store dispatches to avoid overlapping issues. For example, in ST mode, the ISU does not issue a virtual SRQ entry 40 until real SRQ entry 0 is deallocated by an entry 0-store drain. Further, in SMT4 mode, the ISU cannot issue Tx virtual SRQ entry 20 until real Tx SRQ entry 0 is drained and deallocated.

Figure 5:
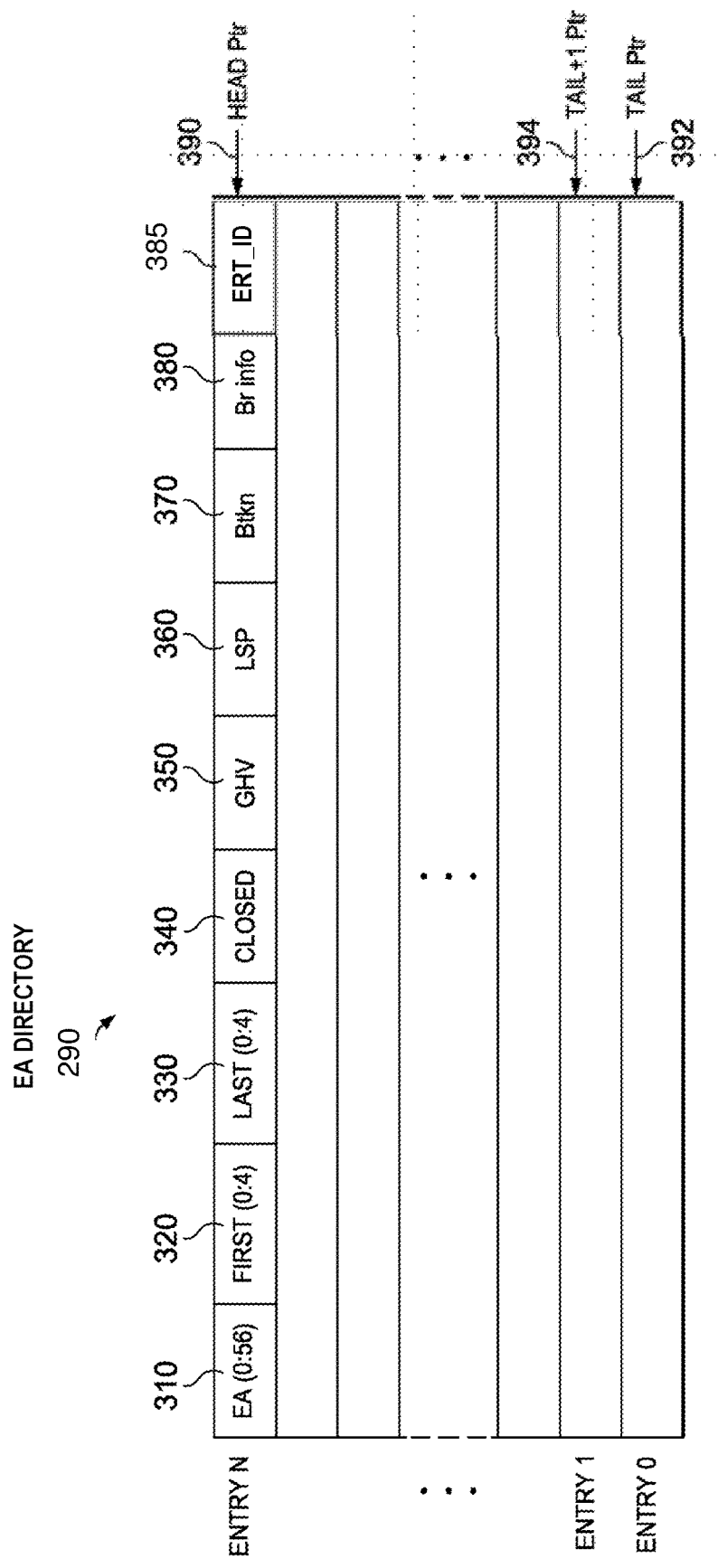
FIG. 5 is an exemplary block diagram of an effective address directory (EAD) structure (L1 cache) in accordance with one illustrative embodiment.

FIG. 5 is an exemplary block of an effective address directory structure (EAD) 290 of an L1 cache in accordance with one or more embodiments of the present invention. In one or more examples, the EAD is part of the IFU/IDU 106. As shown in FIG. 5, the EAD 290 is comprised of one or more entries, e.g., entry 0 to entry N, with each entry comprising a plurality of fields of information regarding a group of one or more instructions. For example, in one illustrative embodiment, each entry in the EAD 290 may represent between 1 and 32 instructions. Entries in the EAD 290 are created in response to a fetch of an instruction that is in a new cache line of the processor cache, e.g., the L2 cache 260 in FIG. 2. The entry in the EAD 290 is updated as additional instructions are fetched from the cache line. Each entry of the EAD 290 is terminated on a taken branch (i.e. a fetched branch instruction from the cache is resolved as "taken"), cache line crossing (i.e. the next fetched instruction is in a different cache line from the current cache line), or a flush of the processor pipeline (such as when a branch misprediction occurs or the like).

As shown in FIG. 5, the fields of the EAD 290 entry comprise a base effective address 310, a first instruction identifier 320, a last instruction identifier 330, a closed identifier 340, a global history vector field 350, a link stack pointer field 360, a branch taken identifier 370, and a branch information field 380. A head pointer 390 points to the head, or youngest entry, in the EAD 290. A tail pointer 392 points to the tail, or oldest entry, in the EAD 290. In addition, a tail+1 pointer 394 is provided for pointing to the entry in the EAD 290 that is second to the tail, or oldest, entry in the EAD 290.

The base effective address 310 is the starting EA of the group of instructions. Each instruction in the group of instructions has the same base EA and then an offset from it. For example, in one illustrative embodiment, the EA is a 64-bit address comprising bits 0:63. The base EA may comprise, in one illustrative embodiment, bits 0:56 of this EA with bits 57:61 representing the offset from the base EA for the specific instruction within the group of instructions. Bits 62 and 63 point to a specific byte of each instruction. In the illustrative embodiment, each address references an instruction that is 32 bits long (i.e. 4 bytes), where each byte in memory is addressable. An instruction cannot be further divided into addressable subcomponents, and thus an instruction address will always have bits 62 and 63 set to zero. Therefore, bits 62 and 63 do not need to be stored and can always be assumed to be zero by the EAD.

The first instruction identifier field 320 stores the effective address offset bits, e.g., bits 57:61 of the EA for the first instruction in the group of instructions to which the EAD 290 entry corresponds. A combination of the base EA from field 310 and the effective address offset bits in the first instruction identifier field 320 provides the EA for the first instruction in the group of instructions represented by the EAD 290 entry. This first field 320 may be used, as discussed hereafter, for recovering a refetch address and branch prediction information in the event that the pipeline is flushed, for example.

The last instruction identifier field 330 stores the effective address offset bits, e.g., bits 57:61 of the EA, for the last instruction in the group of instructions to which the EAD 290 entry corresponds. EAD logic updates this field as additional instructions in the group of instructions represented by the EAD 290 entry are fetched. The EAD logic discontinues updating of this field 330 in the particular EAD 290 entry in response to the EAD 290 entry being closed when a cache line crossing or taken branch is found. This field will remain intact unless a pipeline flush occurs that clears out a portion of the EAD entry. In such cases, the EAD logic updates this field to store the effective address offset bits of the instruction that is now the new last instruction in the entry as a result of the flush. This field is ultimately used for completion, as discussed hereafter, to release the entry in the EAD 290.

The closed identifier field 340 is used to indicate that the EAD 290 entry has been closed and no more instruction fetches will be made to fetch instructions for the instruction group corresponding to the EAD 290 entry. An EAD 290 entry may be closed for a variety of different reasons, including a cache line crossing, a branch being taken, or a flush of the pipeline. Any of these conditions may result in the value in the closed field 340 being set to indicate the EAD entry is closed, e.g., set to a value of "1." This field 340 is used at completion to release an entry in the EAD 290, as discussed in greater detail hereafter.

The global history vector field 350 identifies the global history vector for the first instruction fetch group that created the entry in the EAD 290. The global history vector is used to identify a history of whether branches were taken or not taken, as discussed in greater detail hereafter. The global history vector is used for branch prediction purposes to help in determining, based on the recent history of branches being taken or not taken, whether a current branch is likely to be taken or not.

The link stack pointer field 360 identifies the link stack pointer for the first instruction fetch group that created the entry in the EAD 290. The link stack pointer is another branch prediction mechanism that will be described in greater detail hereafter.

The branch taken field 370 indicates whether the group of instructions corresponding to the EAD 290 entry had a branch instruction in which the branch was taken. The value in the branch taken field 370 is updated in response to a branch instruction of the instruction group represented by the EAD 290 entry being predicted as taken. In addition, once a branch in the instructions of the EAD 290 entry is taken, the EAD 290 entry is also closed by writing the appropriate value to the closed field 340. Since the branch taken field is written speculatively at prediction time, it may need to be replaced with the correct value when the branch is actually executed. For example, a branch could be predicted as not taken, in which case a "0" would be written into the branch taken field. However, later in execution, the branch could be found to be taken, in which case the field must be corrected by writing it to a value of "1." The second write only occurs if the branch was mispredicted.

The branch information field 380 stores miscellaneous branch information that is used for updating branch prediction structures when a branch resolves, or architected EA state when a branch instruction completes.

The ERT_ID field 385 stores an index into the ERT table (described further), which identifies a corresponding ERT entry. When an ERT entry is invalidated, the associated ERT_ID is invalidated and it will also invalidate all associated entries in L1 cache and L1 D cache.

Entries in the EAD 290 are accessed using an effective address tag (eatag) that comprises at least two parts: base eatag and an eatag offset. In one illustrative embodiment, this eatag is a 10-bit value, which is relatively much smaller than the 64-bit EA. With a 10 bit eatag value, and a EAD 290 having a size of 14 entries, in one exemplary implementation, the eatag is comprised of a first 5 bits, referred to as the base eatag, for identifying an entry within the EAD 290 and a second 5 bits, referred to as the eatag offset, for providing the offset of the specific instruction within the group of instructions represented by the entry in the EAD 290. A first bit in the 5 bits identifying the entry within the EAD 290 may be used as a wrap bit to indicate whether a wrap occurred when going from the topmost entry to the bottom most entry of the EAD 290. This may be used for age detection. The second through fifth bits of the 5 bits identifying the entry within the EAD 290 may be used to index into the EAD to identify the base EA of the instruction, i.e. EA(0:56). The 5 bit offset value may be used to provide, for example, bits 57:61 of the particular instruction's EA. This example eatag is illustrated below:

eatag(0:9)=row(0:4)||offset(0:4)
row(0): Wrap bit for the EAD indicating whether or not a wrap occurred when going from the topmost entry to bottom most entry of the EAD.
row(1:4): Index into 14-entry EAD used to determine EA(0:56) of the instruction.
offset(0:4): Bits 57:61 of the instruction's EA.

Figure 6:
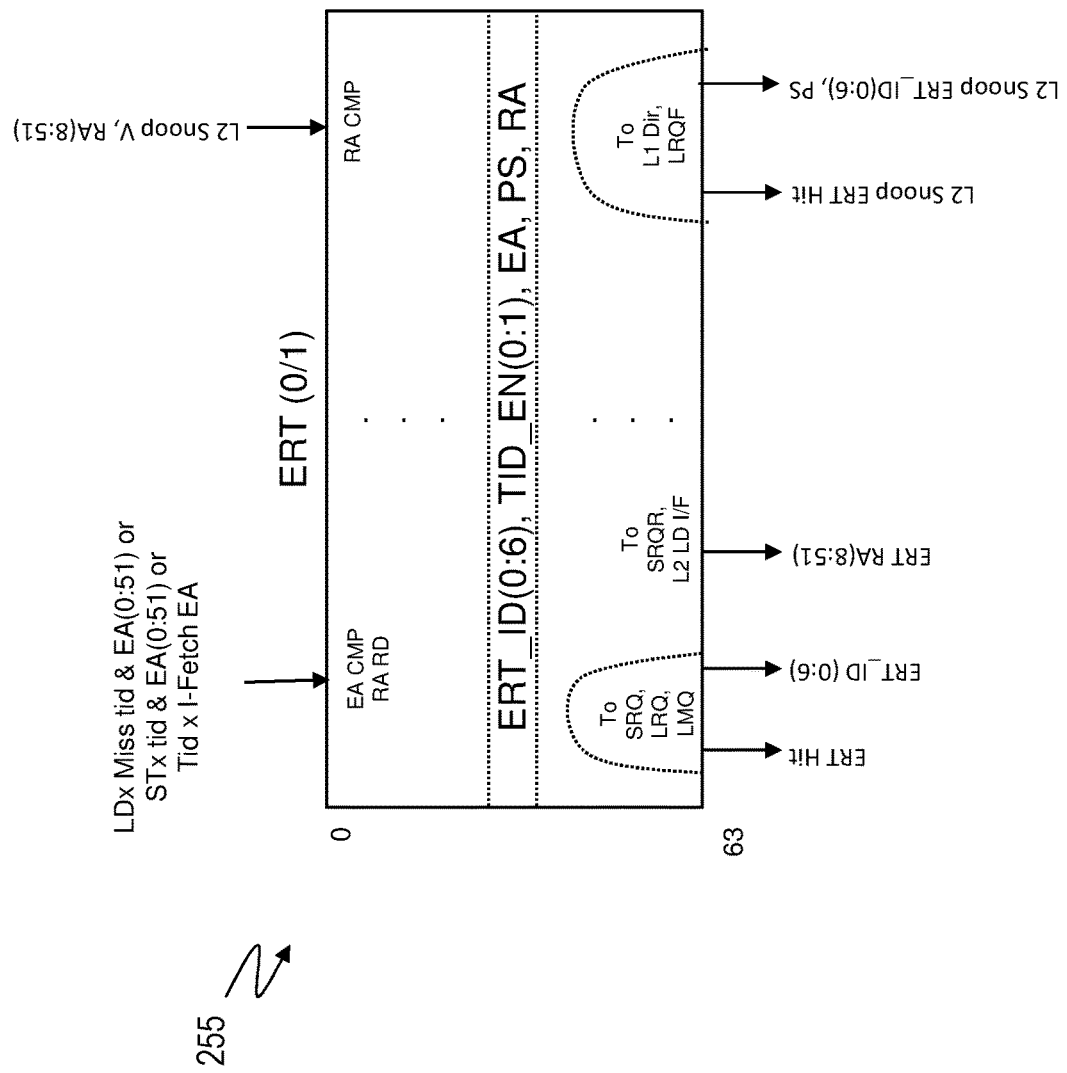
FIG. 6 is an exemplary block of an effective address directory structure (L1 cache) in accordance with one illustrative embodiment.

FIG. 6 depicts an example effective real table (ERT) structure according to one or more embodiments of the present invention. In one or more examples, the ERT 255 includes 128 total entries, however it should be noted that the total number of entries can be different in other examples, and further that the number of entries may be selectable or programmable. Further, in case the LSU executes two instructions via separate threads in parallel, the LSU maintains two instances of the ERT 255 with 64 (half) entries each, for example an ERT0 and an ERT1. The description below describes any one of these instances, unless specified otherwise.

The ERT 255 includes a valid ERT entry, which exists for any page active in the L1 I-Cache or D-Cache directory (EAD 290) or an SRQ entry or an LRQF entry or an LMQ entry. In other words, ERT 255 is a table of all active RPN's in the LSU 1042 and IFU (L1 DC, SRQ, LRQE, LRQF, LMQ, and IC). In one or more examples, if the OoO processor is operating in ST mode, all entries in the ERT 255 are used for the single thread that is being executed. Alternatively, in one or more examples, the entries in the ERT 255 are divided into sets, and in ST mode, each set has the same content. For example, if the ERT 255 has 128 total entries, and supports maximum two threads, when the processor operates in ST mode, the ERT 255 includes two sets of 64 entries each, and the two sets have the same content.

Alternatively, if the OoO processor is operating in the SMT mode, the ERT entries are divided among the threads being executed. For example, in case of two threads, the ERT entries are divided into two equal sets, a first set of entries associated with a first thread, and a second set of entries associated with a second thread. For example, 1 copy for LD0 pipe L1 misses, ST0 pipe launches, T0/T2 I-Fetches: ERT0, which handles T0 in SMT2 mode and T0/T2 in SMT4 mode; and 1 copy for LD1 pipe L1 misses, ST1 pipe launches, T1/T3 I-Fetches: ERT1, which handles T1 in SMT2 mode and T1/T3 in SMT4 mode.

In one or more examples, each ERT entry includes at least the following fields ERT fields, ERT_ID (0:6), Tid_en (0:1), Page Size (0:1), EA (0:51), and RA (8:51). The ERT_ID field is a unique index for each ERT entry. For example, the ERT_ID may include a sequential number that identifies the ERT entry. The ERT_ID is stored in the ERT_ID field 285 of the EAD 290, and other data structures used by the LSU 1042. The TID_en field indicates if the entry is enabled for being used in MT mode, and in one or more examples the thread identifier of the instruction that is using the ERT entry. Further, the Page Size indicates the memory page size to which the ERT entry refers. The RA includes a real address associated with the ERT entry.

The LSU refers to the ERT 255 only in cases where the RA is to be used for completing execution of an instruction. As described herein, the ERT 255 is consulted by the LSU 1042 for the following four functions, (1) Ifetch, Load or store missing the L1 cache; (2) stores from another thread within the core; (3) Snoop (XI) from another core; and (4) TLB and SLB invalidation.

In the first case of Ifetch, Load or store missing the L1 cache, the EA and thread_id are used to index into the ERT 255 and the RA from the corresponding ERT entry is sent to the L2 cache if a valid ERT entry exists. In case of an ERT miss, that is a valid ERT entry does not exist for the EA and thread_id, the SLB/TLB is used.

In the second case, where stores from another thread within the core, a store drained from the SRQ checks the ERT 255 and ERTE table (described further) for a hit from another thread. If there is no hit from a different thread, then there is no load from another thread that is using the same RA. If there is a hit from a different thread using the same RA, the LSU 1042 checks the LRQ. Although, rare, in case a hit from another thread exists if the RA is used by another thread(s). Accordingly, the LSU 1042 looks up the ERT table 255 to find the relevant EA(s) for the common RA. The EA(s) are then used to look into the LRQ for a match (reject any store issue in that cycle). LRQ is partitioned per thread, so the LSU 1042 only looks into relevant thread's LRQ. If there is matching load(s) in the LRQ, the LSU 1042 flushes the oldest of the matching load(s).

In the third case of a snoop from another core of the processor, the LSU 1042 operates similar to the second case and checks for a hit from any of the other threads being executed. In the fourth case, when the TLB/SLB is invalidated, the ERT 255 is also invalidated.

Figure 7:
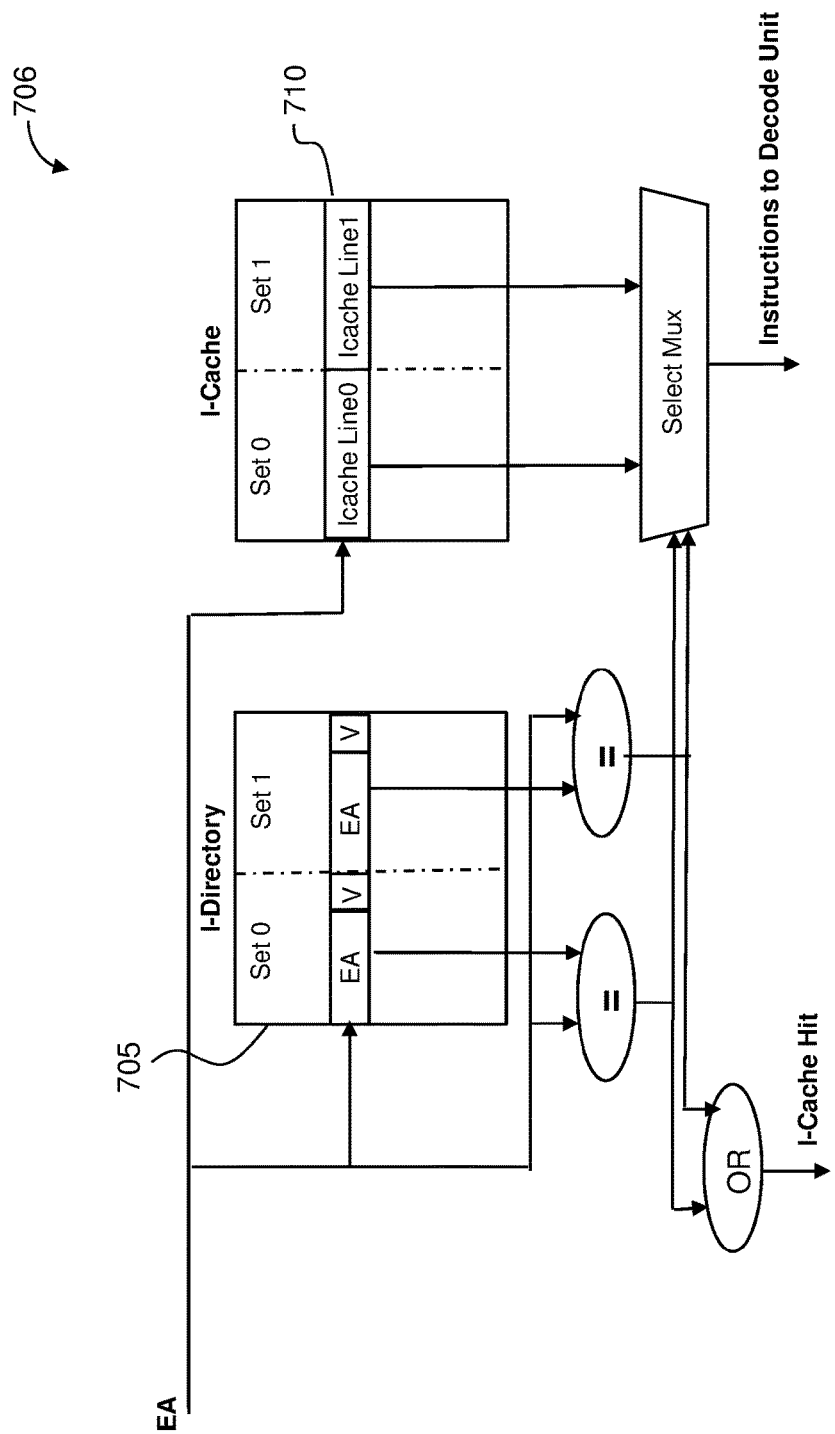
FIG. 7 depicts an IFU/instruction decode unit (IDU) of a processing core according to one or more embodiments of the present invention.

FIG. 7 illustrates an L1 Instruction Cache 706, according to one or more embodiments of the present invention. The L1 Instruction Cache 706 comprises an I-directory 705, and I-cache 710. I-cache 710 stores the instructions, which are supplied to an instruction fetch buffer (not shown) for execution. I-directory 705 contains a collection of EAs, validity bits, and other information, used to manage I-cache 710, and in particular to determine whether a desired instruction is in fact in the I-cache 710. In this instance, the I-directory 705 now stores an EA instead of an RA. Moreover, L1 instruction cache 706 utilizes the ERT 255 instead of utilizing an ERAT.

The IFU/IDU 706 can access the ERT 255 for the following functions, (1) to provide an RA to the L2 cache on an L1 I-cache miss; (2) cache line invalidation; (3) instruction cache block invalidate (ICBI) handling; and (4) TLB and SLB invalidation.

When a cache line is invalidated, the RA to be invalidated is sent by the L2 cache or an L3 cache to the L1 I-cache for invalidation. The fetched I-cache line can be invalidated by using the associated RA to index the ERT structure in order to obtain an associated EA. The obtained EA can be used to check the I-directory 705. If a match exists in the I-directory 705, the entry in the I-directory 705 is invalidated. Accordingly, the I-cache 710 can maintain synchronization with translations.

Sources of cache line invalidation can include ICBI instruction. The EA can use the ICBI to access the I-directory 705 and invalidate a cache line that matches the EA and a validity thread bit (V).

The IFU/IDU 706 utilizing the I-directory 705 and I-cache 710 can be employed in a variety of simultaneous multi-threading scenarios. For example, when the translation between EA and RA differ between threads, I-cache lines cannot be shared among SMT threads and each I-directory entry is tagged with a thread_id. There may be multiple entries in the I-directory 705 for the same EA but different thread_id values. The thread_id can be used to ensure a hit will occur for only a correct thread by comparing the thread_id in the I-directory entry to the thread_id which is associated with the fetch request.

When the OoO processor supports more than 2 SMT threads, the translation between EA and RA may be common among some threads but not others. The I-directory 705 may include one validity bit per thread to indicate for which thread(s) an I-cache line is valid. For example, if the OoO processor supports 4 threads, each I-cache line has 4 validity bits indicating which thread(s) for the I-cache line is valid. If any thread is not valid, an associated validity bit is set to 0. If two of the threads translate the EA to the same RA, then the I-cache line can be shared.

In an exemplary implementation, when installing a new I-cache line for a thread A, the IFU/IDU 706 can check the ERT table 255 to determine whether another thread B has the same EA-RA translation. If thread B does not have the same EA-RA translation as thread A, an installation of a new entry in the I-cache 710 occurs with only one valid bit turned on for thread A.

If thread B has the same EA-RA translation as thread A, the IFU/IDU 706 can determine whether an I-cache line already exists for thread B. If the I-cache line already exists, the thread valid bit for thread A is turned on causing thread A to share the I-cache line with thread B. If the I-cache line for thread B does not exist, a new entry in the I-cache 710 is installed with only one valid bit turned on for thread A.

If thread B has the same EA, but a different EA-RA translation, a new entry in the I-cache is installed with only one valid bit turned on for thread A. In this instance, there will be two different entries in the I-cache 710 having the same EA, one valid for thread A and another valid for thread B.

Figure 8:
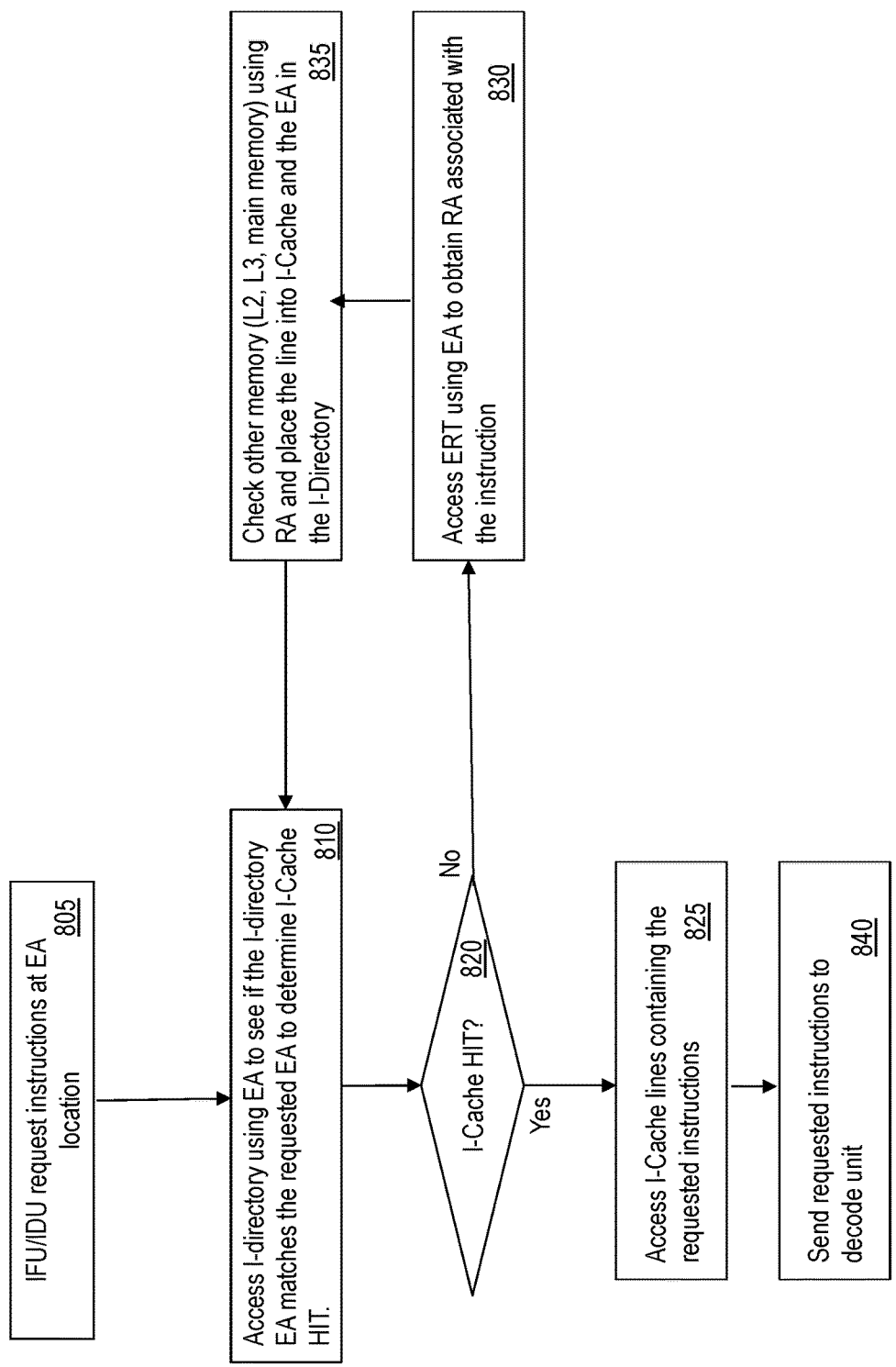
FIG. 8 illustrates a flowchart of an example method for accessing memory for executing instructions by an IFU according to one or more embodiments of the present invention.

FIG. 8 illustrates a flowchart of an example method 800 for accessing memory for handling instructions by an IFU/IDU according to one or more embodiments of the present invention. At block 805, one or more instructions to be executed are requested by the IFU/IDU 706. At block 810, the IFU/IDU 706 determines whether the requested one or more instructions reside in an L1 I-cache, for example, I-cache 202. This determination can be made by comparing the EA of the requested instructions with the EA in the I-directory 705 associated with the IDU/IDU 706. If the two EAs match, then there is an I-Cache hit at block 820. In an exemplary embodiment, if there is an EA match, then there is an automatic I-Cache hit, that is, there is no need to access an ERT 255 and check for an RA. If an I-Cache hit occurs, the method 800 proceeds to block 825 where the I-Cache lines containing the one or more instructions are selected. At block 840, the one or more instructions are sent to the IFU/IDU 706 for decode.

If the EA in the I-directory 705 does not match the EA of the requested one or more instructions, then there is a I-Cache miss and the ERT 255 is accessed to translate the EA of the requested one or more instructions to the RA in block 830. In block 835, this RA is then sent to other portions of memory (e.g., L2, L3 or main memory) to get the one or more instructions (or a full cache line containing the one or more instructions) and install them into the I-Cache 706 and I-directory 705. Once the one or more instructions are in the I-Cache, block 810 can engage to determine an I-Cache hit and then continue.

By implementing the L1-Instruction Cache 706 described above, when the I-cache 706 fetches an instruction, if there is an EA-hit in the EA-based L1 I-directory, then no address translation is performed. This improves on the typical 000 processor where the L1 I-directory is RA-based, which can cause the EA to be sent to an ERAT table for translation to get the RA.

Figure 9:
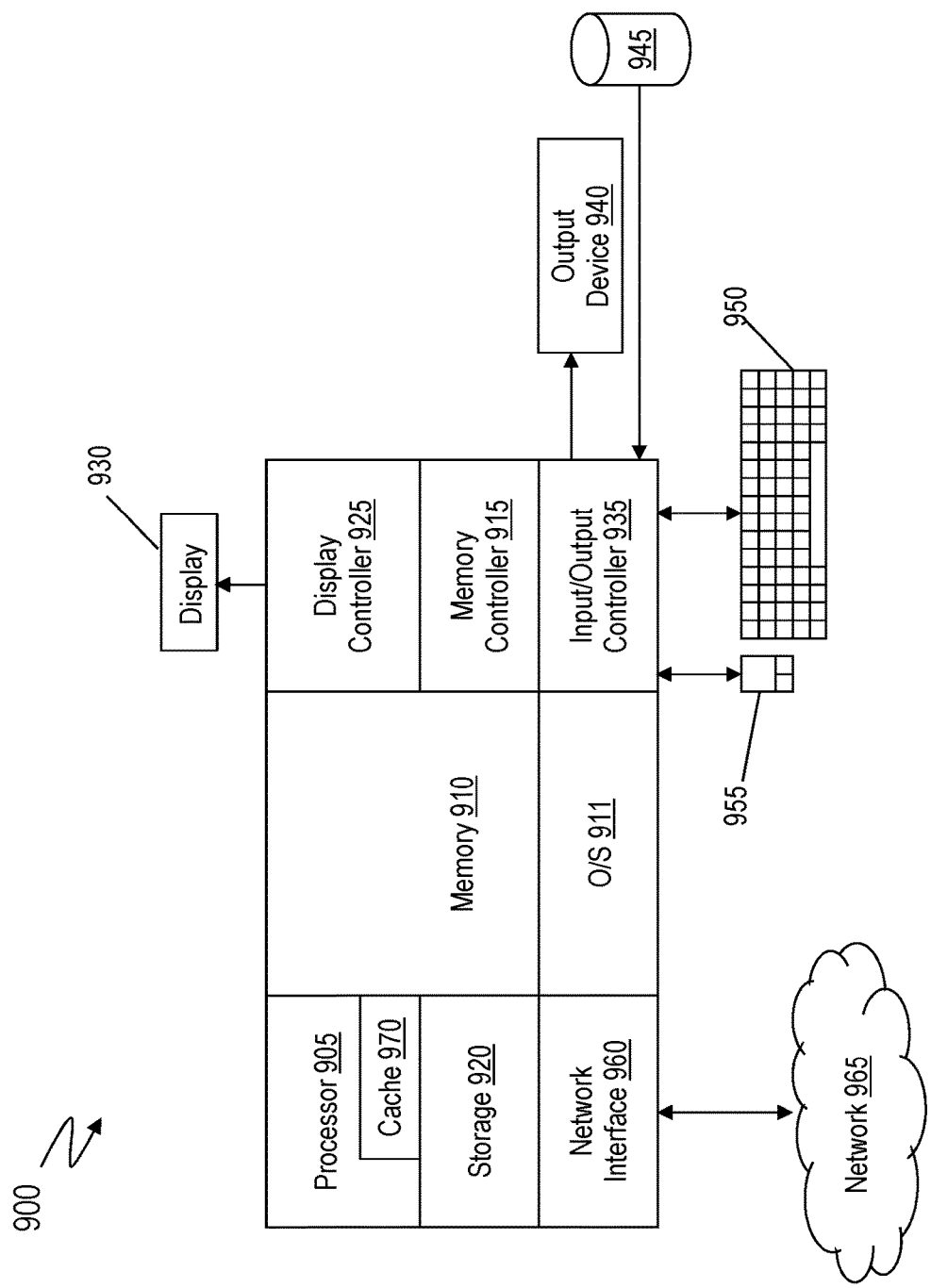
FIG. 9 depicts a block diagram of a computer system for implementing some or all aspects of one or more embodiments of the present invention.

Turning now to FIG. 9, a block diagram of a computer system 900 for implementing some or all aspects of one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 900, such as a mobile device, personal computer, workstation, minicomputer, or mainframe computer.

In an exemplary embodiment, as shown in FIG. 9, the computer system 900 includes a processor 905, memory 912 coupled to a memory controller 915, and one or more input devices 945 and/or output devices 947, such as peripherals, that are communicatively coupled via a local I/O controller 935. These devices 947 and 945 may include, for example, a printer, a scanner, a microphone, and the like. A conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 947, 945 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 912. The processor 905 may be a custom made or commercially available processor, a central processing unit (CPU), an auxiliary processor among several processors associated with the computer system 900, a semiconductor based microprocessor (in the form of a microchip or chip set), a microprocessor, or other device for executing instructions. The processor 905 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 912 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 912 may incorporate electronic, magnetic, optical, or other types of storage media. Note that the memory 912 may have a distributed architecture, where various components are situated remote from one another but may be accessed by the processor 905.

The instructions in memory 912 may include one or more separate programs, each of which comprises an ordered listing of executable instructions for implementing logical functions. In the example of FIG. 9, the instructions in the memory 912 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 927, which may be a storage device such as a hard disk drive or solid state drive. The stored instructions in memory 912 or in storage 927 may include those enabling the processor 905 to execute one or more aspects of the dispatch systems and methods of this disclosure.

The computer system 900 may further include a display controller 925 coupled to a display 930. In an exemplary embodiment, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In an exemplary embodiment, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing an EA based IFU in an OoO processor can be embodied, in whole or in part, in computer program products or in computer systems 900, such as that illustrated in FIG. 9.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for out-of-order execution of one or more instructions by a processing unit, the method comprising:
   receiving, by an instruction fetch unit (IFU), a request to fetch an instruction for execution, wherein the instruction includes an effective address (EA);
   accessing, by the IFU, an instruction cache directory (I-directory) using the EA of the requested instruction to determine whether the EA of the requested instruction matches an EA stored in an associated instruction cache (I-cache), wherein the I-directory includes EAs of instructions stored in the I-cache and does not include real addresses (RAs) of the instructions stored in the I-cache, thereby not requiring translation from the EA to a RA in order to determine whether the instruction is in the I-cache;
   outputting, by the I-cache, the requested instruction in response to or based at least in part on determining that the requested instruction EA matches an entry in the I-cache; and
   decoding, by a decode unit, the requested instruction output by the I-cache.

2. The computer-implemented method of claim 1, wherein the processing unit is an out-of-order processor.

3. The computer-implemented method of claim 1, wherein an effective real table (ERT) is used to output the requested instruction.

4. The computer-implemented method of claim 3, wherein the ERT is stored outside the IFU.

5. The computer-implemented method of claim 3, wherein the ERT is stored in a load store unit.

6. The computer-implemented method of claim 3, wherein the ERT stores translations associated with EA-to-real address (RA) translations and RA-to-EA translations.

7. The computer-implemented method of claim 3 further comprising invalidating one or more I-cache lines or D-cache lines associated with an EA matching an ERT entry when the ERT entry is invalidated.

8. A system comprising:
   a memory having computer readable instructions; and
   one or more processors, wherein at least one of the one or more processors includes:
   an instruction fetch unit (IFU), the IFU comprising an instruction directory array (I-directory), wherein the I-directory contains one or more effective addresses (EA);
   an instruction cache array (I-cache); and
   a decode unit, the decode unit operable to decode an instruction to be executed;
   wherein the IFU is operable to:
   receive a request to execute an instruction, wherein the instruction includes an EA;
   access the I-directory using the requested instruction EA to determine whether the requested instruction EA matches an EA stored in the I-cache, wherein the I-directory includes EAs of instructions stored in the I-cache and does not include real addresses (RAs) of the instructions stored in the I-cache, thereby not requiring translation from the EA to a RA in order to determine whether the instruction is in the I-cache; and output, to the decode unit, the requested instruction in response to or based at least in part on determining that the requested instruction EA matches an entry in the I-cache.

9. The system of claim 8, wherein an effective real table (ERT) is used to output the requested instruction.

10. The system of claim 9, wherein the ERT is stored outside the IFU.

11. The system of claim 9, wherein the ERT is stored in a load store unit.

12. The system of claim 9, wherein the ERT stores translations associated with EA-to-real address (RA) translations and RA-to-EA translations.

13. The system of claim 12, wherein the I-cache synchronizes with at least one stored translation by invalidating one or more I-cache lines or D-cache lines associated with an EA matching an ERT entry when the ERT entry is invalidated.

14. The system of claim 9, wherein at least one of the one or more processors is an out-of-order processor.

15. A computer program product comprising a computer readable storage medium having program instructions embodied therewith, the program instructions executable by a processor to cause the processor to perform operations comprising:

receiving a request to fetch an instruction for execution, wherein the instruction includes an effective address (EA);

accessing an instruction cache directory (I-directory) using the requested instruction EA to determine whether the requested instruction EA matches an EA stored in an associated instruction cache (I-cache), wherein the I-directory includes EAs of instructions stored in the I-cache and does not include real addresses (RAs) of the instructions stored in the I-cache, thereby not requiring translation from the EA to a RA in order to determine whether the instruction is in the I-cache;

outputting the requested instruction in response to or based at least in part on determining that the requested instruction EA matches an entry in the I-cache; and decoding the requested instruction output by the I-cache.

16. The computer program product of claim 15, wherein an effective real table (ERT) is used to output the requested instruction.

17. The computer program product of claim 16, wherein the ERT is stored outside the IFU.

18. The computer program product of claim 16, wherein the ERT is stored in a load store unit.

19. The computer program product of claim 16, wherein the ERT stores translations associated with EA-to-real address (RA) translations and RA-to-EA translations.

20. The computer program product of claim 16 further comprising invalidating one or more I-cache lines or D-cache lines associated with an EA matching an ERT entry when the ERT entry is invalidated.

* * * * *